(No Model.)
W. GUSSENHOVEN, Jr.
TIRE FOR VEHICLE WHEELS.
No. 580,859. Patented Apr. 20, 1897.
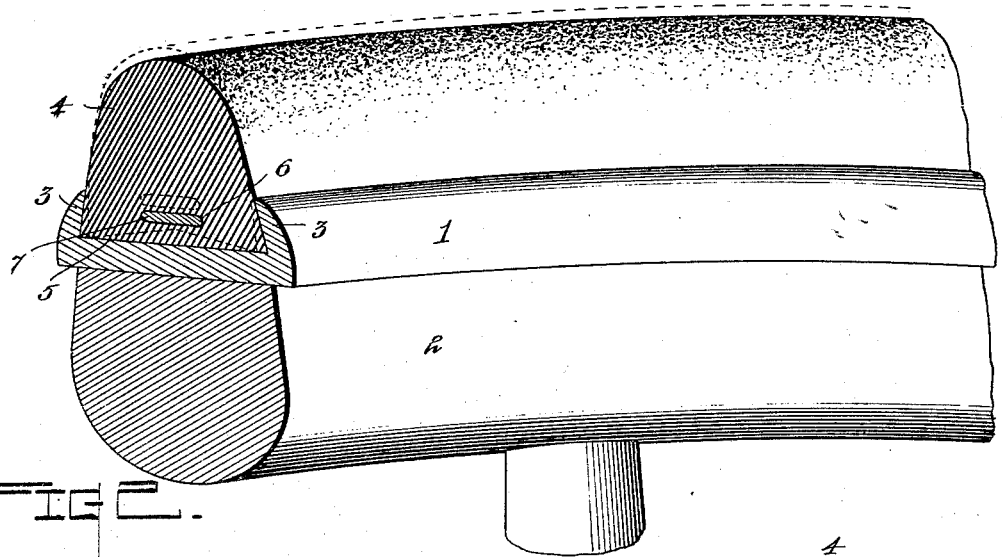
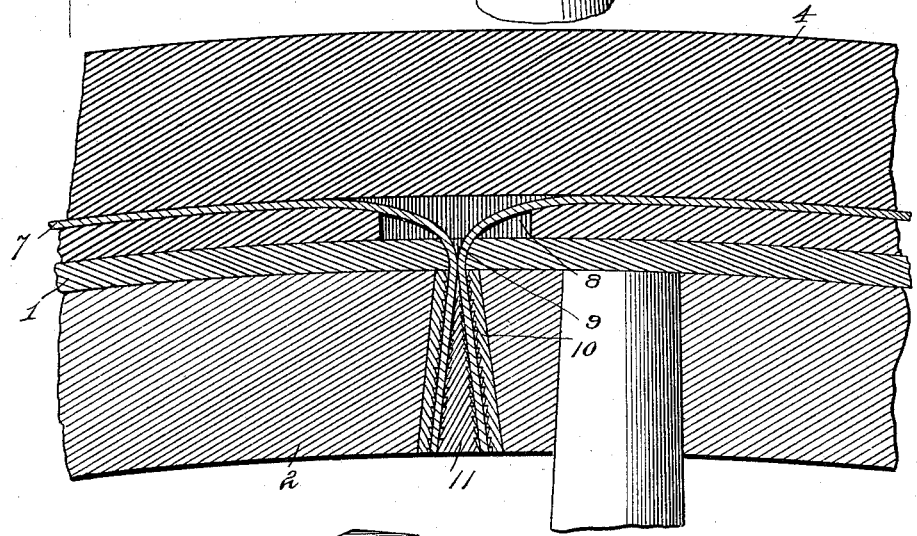
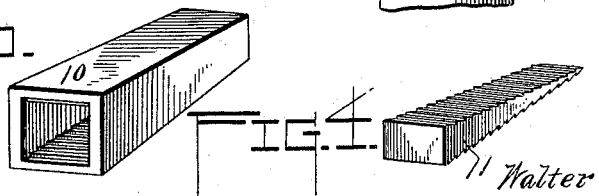
Witnesses
Inventor
Walter Gussenhoven Jr.
By his Attorneys,
C. A. Snow & Co.

UNITED STATES PATENT OFFICE.

WALTER GUSSENHOVEN, JR., OF NEW YORK, N. Y.

TIRE FOR VEHICLE-WHEELS.

SPECIFICATION forming part of Letters Patent No. 580,859, dated April 20, 1897.

Application filed February 15, 1897. Serial No. 623,462. (No model.)

*To all whom it may concern:*

Be it known that I, WALTER GUSSENHOVEN, Jr., a citizen of the United States, residing at New York, in the county of New York and State of New York, have invented a new and useful Tire for Vehicle-Wheels, of which the following is a specification.

The invention relates to improvements in tires for vehicle-wheels.

The object of the present invention is to improve the construction of the elastic tires for vehicle-wheels and to provide a simple, inexpensive, and efficient one which may be readily applied to a vehicle-wheel.

The invention consists in the construction and novel combination and arrangement of parts hereinafter fully described, illustrated in the accompanying drawings, and pointed out in the claim hereto appended.

In the drawings, Figure 1 is a detail perspective view of a portion of a vehicle-wheel provided with a tire constructed in accordance with this invention. Fig. 2 is a longitudinal sectional view of the vehicle-wheel, illustrating the manner of connecting the ends of the tire-holding band. Figs. 3 and 4 are detail perspective views illustrating the construction of the tapering box or casing and the wedge.

Like numerals of reference designate corresponding parts in all the figures of the drawings.

1 designates a metal rim arranged on the outer periphery of a wooden felly 2 and provided at opposite sides with outwardly-converging flanges 3, which have straight inner faces and which form a dovetail groove or trough for the reception of an elastic tire 4. The tire 4, which is tapering in cross-section, is expanded within the groove or trough of the rim 3 and is thereby securely held in the same. The inner face 5 of the elastic tire is hollowed out, as illustrated in dotted lines in Fig. 1 of the accompanying drawings, and the hollowed-out portion is formed by two straight faces arranged at an angle to each other to provide a substantially V-shaped recess.

The elastic tire is provided with a longitudinal opening 6, in which is arranged a steel band 7, disposed centrally of the tire adjacent to the inner face of the same and adapted when tightened to draw the central portion of the tire downward to expand the latter in the trough or groove of the rim 1.

The ends of the band, which is preferably constructed of steel, extend inward through a recess 8 of the tire and an opening 9 of the rim and are received within a tapering box or casing 10, which is mounted in the wooden felly and which receives a wedge 11. The inner faces of the sides of the tapering box or casing 10 are provided with shouldered teeth, and the sides of the wedges are provided with similar shouldered teeth. The shoulders of the teeth are arranged at the inner ends of the same and are adapted to engage the terminals of the band to prevent the same from being drawn outward from the box or casing. The wedge is interposed between the terminals of the band, and each end of the latter is engaged by the teeth at one side of the box or casing and the adjacent teeth of the wedge and is securely held.

It will be seen that the elastic tire is simple and comparatively inexpensive in construction, that it is strong and durable, and that it is adapted to be readily applied to a vehicle-wheel.

What I claim is—

In a device of the class described, the combination of a felly, a rim arranged on the felly and provided with a dovetail groove, an elastic tire having its inner face hollowed out and provided adjacent to the same with a longitudinal opening, a centrally-arranged band passing through the said opening and adapted to compress the tire at that point to expand the same in the groove, a tapering box or casing mounted in the felly, receiving the terminals of the band and provided with teeth for engaging the same, and a wedge provided with teeth and interposed between the ends of the band, substantially as and for the purpose described.

In testimony that I claim the foregoing as my own I have hereto affixed my signature in the presence of two witnesses.

WALTER GUSSENHOVEN, JR.

Witnesses:
CORNELIUS J. HEYBLONY,
S. VAN VLIET.